United States Patent [19]
Berke et al.

[11] Patent Number: 5,880,193
[45] Date of Patent: Mar. 9, 1999

[54] DISPERSANTS FOR PIGMENT CONCENTRATES

[75] Inventors: Fritz Berke, Herne; Volker Schrenk, Gelsenkirchen; Manfred Scheiba; Werner Schaefer, both of Essen; Guenter Hahn, Muelheim, all of Germany

[73] Assignee: HUELS Aktiengesellschaft, Marl, Germany

[21] Appl. No.: 637,471

[22] Filed: Apr. 25, 1996

[30] Foreign Application Priority Data

May 4, 1995 [DE] Germany .................. 195 16 387.7

[51] Int. Cl.$^6$ ...................................... C08L 31/06
[52] U.S. Cl. .................. 524/385; 524/275; 524/513; 524/515
[58] Field of Search .................. 524/385, 513, 524/515, 275

[56] References Cited

U.S. PATENT DOCUMENTS 3,527,844  9/1970  Hull et al. .................. 525/88

FOREIGN PATENT DOCUMENTS 0 553 655  8/1993  European Pat. Off. .
42 36 337  1/1994  Germany .

OTHER PUBLICATIONS

Database WPI, Derwent Publications, AN–94–283389, and Patent Abstracts of Japan, vol. 18, No. 575 (C–1268), Nov. 4, 1994, JP–A–06 211 951, Aug. 2, 1994.

*Primary Examiner*—Marion McCamish
*Assistant Examiner*—John J. Guarriello
*Attorney, Agent, or Firm*—Oblon, Spivak, McClelland, Maier & Neustadt, P.C.

[57] ABSTRACT

The preparation of pigment concentrates for the coloring of resin molding compositions in which the pigment is very finely dispersed is carried out successfully using, for the preparation of the pigment concentrates, a dispersant which contains the following components:

from 0 to 90% by weight of a substantially amorphous poly-α-olefin,
from 0 to 90% by weight of polyolefin wax,
from 0 to 30% by weight of crystalline polyolefin, and
from 1 to 50% by weight of a specific polyacrylic acid ester.

18 Claims, No Drawings

DISPERSANTS FOR PIGMENT CONCENTRATES

BACKGROUND OF THE INVENTION

1. Field of the Invention

The present invention relates to a dispersant useful for pigment preparations for coloring polyolefins, and to pigment preparations prepared using this dispersant.

2. Discussion of the Background

Pigment preparations suitable for the coloring of polyolefins are already known. DE-B 12 39 093 describes carrier materials based on a mixture of an amorphous ethylene-propylene block copolymer having a viscosity of 5000–300,000 cp at 150° C. and a low molecular weight, crystalline polypropylene. The use of polypropylene wax having a viscosity of 500–5000 cp at 170° C. and an isotactic content of 40–90% by weight is described in DE-A 26 52 628. DE-C 42 36 337 reveals that certain polyacrylic acid esters are suitable as dispersants for pigments in organic media.

With the present prior art, however, when using such carrier materials in the coloring of polyolefins, it is not possible to completely prevent the occurrence of agglomerates. This is particularly disadvantageous in the preparation of colored polyolefin fibers, since pigment agglomerates can lead both to the blockage of the melt screens of the spinning extruder and to fiber breakage. Fiber breakages are extremely undesirable since they lead to a breakdown in production which is associated with considerable downtimes and substantial cleaning operations.

OBJECTS OF THE INVENTION

One object of the invention was therefore to develop a suitable dispersant which can be used to give very fine pigment dispersions, with the result that it is now possible, in the production of colored polyolefin fibers, to reliably prevent the fiber breakage caused by pigment agglomeration. The fine pigment dispersions of this kind are also desirable for customary injection molding and extrusion applications, in order to increase tinctorial strength.

DETAILED DISCUSSION OF THE INVENTION

The above objects have been achieved by a dispersant which comprises the following components, based on total weight of dispersant:

I) from 0 to 90% by weight of a substantially amorphous poly-α-olefin;

II) from 0 to 90% by weight of polyolefin wax;

III) from 0 to 30% by weight of crystalline polyolefin, and

IV) from 1 to 50% by weight of a polyacrylic acid ester.

The substantially amorphous poly-α-olefin I) is a polymer or copolymer of one or more α-olefins having from 2 to 6 carbon atoms, such as, for example, ethylene, propene, 1-butene, 1-pentene, 1-hexene, 4-methyl-1-pentene, etc. Mixtures may be used. It can be prepared specifically by polymerization over conventional Ziegler-Natta catalysts or developments thereof, in a known manner, for example, in accordance with DE-C 23 06 667 or DE-C 29 30 108, both incorporated herein by reference. It preferably has the following composition:

from 3 to 75% by weight of α-olefins having from 4 to 6 carbon atoms, from 25 to 95% by weight of propene, and from 0 to 20% by weight of ethylene.

Particularly suitable polyolefins are the propene/1-butene/ethylene terpolymers and propene/1-butene copolymers which are obtainable under the tradename VESTOPLAST®, although it is also possible to use, for example, propene/ethylene or 1-butene/ethylene copolymers or APP (atactic polypropylene).

The amorphous poly-α-olefin generally has a preferred viscosity of from 1000 to 100,000 mpa·s at 190° C.

The proportion of the substantially amorphous poly-α-olefin in the dispersant according to the invention is preferably from 5 to 90% by weight, particularly preferably more than 20% by weight and, in particular, more than 30% by weight, including all values and subranges therebetween.

Polyolefin waxes (component II herein) are known and are described, for example, in Ullmann's Encyklopädie der technischen Chemie [Ullmann's Encyclopedia of Industrial Chemistry], 4th edition, volume 24, Verlag Chemie Weinheim 1983, pp. 36–45 incorporated herein by reference. More than one may be used. In this context, particular mention should be made of polyethylene wax and polypropylene wax. The waxes may be present either as a homopolymer or else as a copolymer with other α-olefins. In general they have a weight-average molecular weight $\overline{M}_w$, in the range from 700 to 30,000, preferably from 900 to 9000. In addition, they preferably have a density of less than 0.94 g/cm³ at 25° C. The polyolefin wax(es) may be used in 0, 10, 20, 30, 40, 50, 60, 70, 80 and 90% by weight including all ranges and values therebetween.

Crystalline polyolefins (component III herein) are also known (Ullmann's Encyklopädie der technischen Chemie, 4th edition, volume 19, Verlag Chemie Weinheim 1980, pp. 167–226; Kirk-Othmer, Encyclopedia of chemical technology, 3rd edition, vol. 16, John Wiley & Sons New York 1981, pp. 385–478 both incorporated herein by reference). Mixtures may be used. Examples of those which are particularly suitable are low, medium or high density polyethylene, homopolypropylene, propylene-ethylene or propylene-butylene random copolymers, random terpolymers of ethylene, propylene and 1-butene, ethylene-propylene block copolymers or poly-1-butene. In a preferred embodiment, an isotactic polypropylene is used. A particularly suitable crystalline polyolefin, including isotactic polypropylene, has an MFR value 230/2.16 according to ISO 1133 of 10–40 g/10 min. The crystalline polyolefins may be used in 0, 5, 10, 15, 20, 25 or 30% including all values and ranges therebetween.

The polyacrylic acid esters used in accordance with the invention (component IV herein) usually have a weight-average molecular weight $\overline{M}_w$, of from 1000 to 20,000. They are obtainable by transesterification of polyalkyl acrylates (one or more) which have been obtained by free-radical polymerization and whose alkyl radical contains 1 to 3 carbon atoms with a) saturated aliphatic alcohols having 4 to 30 carbon atoms and/or b) unsaturated aliphatic alcohols having 8 to 30 carbon atoms and, additionally if desired, c) polyoxyalkylenemonools of the general formula $$R^1O\text{—}(C_nH_{2n}O\text{—})_xH,$$

where $R^1$ is the hydrocarbon radical of a starting alcohol $R^1OH$ with a maximum of 30 carbon atoms, and is preferably a methyl, ethyl, propyl, butyl, octyl, isooctyl, 2-ethylhexyl, allyl or aralkyl radical, or is the radical of a fatty alcohol, or an alkylsulphonate radical, n is 2, 3 or 4 and in the average polyoxyalkylene group has a mean value of from 2 to 3, and x is from 1 to 70 and in the average polyoxyalkylene monool has a mean value of from 4 to 50, in particular from 6 to 20, and, if desired, d) dialkylaminoalkanols of the general formula HO—$R^2$—$NR^3R^4$, in which $R^2$ is a divalent alkylene radical having 2 to 4 carbon atoms and $R^3$ and $R^4$ are identical or different and are alkyl radicals having 1 to 4 carbon atoms, the molar ratio of the alcohol components a)+b)+c) to the dialkylaminoalcohols d) being from 1:0 to 1:0.5, and the components a) to d) being used in amounts such that from 25 to 70% of the ester groups of the polyalkyl acrylates are transesterified.

As described above, the transesterification alcohol reagent (s) comprise [a), b), c) and d)], [a), b), c)], [a), b), d)], [a), b)], [a)], [b)], [a), c)], [b), c)], [a), d)], [b), d)], [a), c), d)], and [b), c), d)].

Transesterification products of this kind are described, for example, in DE-C 38 42 201 and DE-C 38 42 202 and in DE-A 39 06 702, 40 06 093, 41 23 478, 42 02 187 and 42 24 412, all incorporated herein by reference. These transesterification products have substantial advantages over the analogous copolymers, one example being their substantially more uniform molecular weight distribution. They are largely free of monomeric components. Only through the transesterification process is it possible to prepare polyacrylates whose alcoholic ester component has olefinic double bonds without the formation of by-products of relatively high molecular weight. It is thus readily possible to transesterify a polyacrylic ester with oleyl alcohol and, simultaneously, with other hydroxyl-containing compounds.

In the case of the polyacrylic acid esters to be used in accordance with the invention, the transesterification components a) and b) used are saturated and/or unsaturated alcohols having 4 to 30 and, respectively, 8 to 30 carbon atoms. Suitable alcohols are, in particular, the saturated fatty alcohols which are derived from naturally occurring fatty acids by hydrogenation, such as lauryl alcohol, myristyl alcohol, palmityl alcohol, stearyl alcohol and behenyl alcohol. Particular interest, however, attaches to the unsaturated alcohols, especially oleyl alcohol, the use of which as transesterification component leads to particularly effective dispersants.

Suitable short-chain alcohols are, in particular, neopentyl alcohol, hexyl alcohol, octyl alcohol and 2-ethylhexyl alcohol.

The transesterification component c) is formed by polyoxyalkylenemonools of the general formula

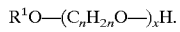

$R^1O$—$(C_nH_{2n}O$—$)_xH$.

In this formula, $R^1$ is the hydrocarbon radical of a starting alcohol $R^1OH$ or of a sulphonic acid radical. The starting alcohol is preferably a lower alcohol. The radical $R^1$ is thus preferably a methyl, ethyl, propyl, butyl, isooctyl, allyl or alkylsulphonate radical. However, it is also possible to choose long-chain radicals, for example the stearyl/behenyl radical. Carbon numbers thus vary from, for example, 1–26.

The index n can have a value of 2, 3 or 4, so that the unit in brackets is an oxyethylene, oxypropylene, oxybutylene or oxytetramethylene unit. Since the polyoxyalkylene monools can be copolymers or can be in the form of a mixture, the average value of n can also be a fractional number. The mean value of n is preferably from 2 to 3, in particular from 2.1 to 2.3. In this context, the oxyalkylene units can be arranged in blocks or randomly.

The index x indicates the number of oxyalkylene units. It preferably has a mean value of from 4 to 50, in particular from 6 to 20.

The transesterification component (d) can be used in addition for transesterification, although its use is optional and is not absolutely necessary. The additional use of the transesterification component d) depends in particular on the nature of the solid to be dispersed and/or on the nature of the organic medium.

The component d) has the general formula HO—$R^2$—$NR^3R^4$, the radicals preferably having, within the definitions indicated above, the following meanings:

$R^2$ is a divalent alkylene radical having 2 or 3 carbon atoms;

$R^3$ and $R^4$ are alkyl radicals having 1 or 2 carbon atoms. Particularly preferred components d) are the compounds HO—$(CH_2)_2$—$N(CH_3)_2$ and HO—$(CH_2)_2$—$N(C_2H_5)_2$.

The molar ratio of components a)+b)+c) to d) is preferably from 1:0 to 1:0.5, although a ratio of from 1:0 to 1:0.2 is generally more preferred.

The reaction is preferably carried out using amounts of components a) to d) which are such that a degree of transesterification of from 25 to 70% is attained. The degree of transesterification is more preferably from about 40 to 60%.

The transesterification may take place in a manner which is known per se from the above-mentioned published and granted patent documents, at temperatures of from about 70° to 140° C. in the presence of a transesterification catalyst and, if desired, in the presence of a solvent.

The dispersant according to the invention can be prepared from the mixture of components I) to IV) by all methods of the prior art, for example by melt mixing; however, it can also be present as a dry blend.

The content of polyacrylic acid ester in the invention dispersant according to the invention is preferably from 3 to 30% by weight and, in particular, from 5 to 15% by weight but includes all values and subranges between 1 and 50% by weight.

The invention dispersant is highly suitable for the dispersion of pigments in polymers. In relation to the use of the individual components, a synergistic effect is obtained.

Suitable pigments of the inorganic or organic type can be found both in the Pigment Handbook, Vol. 1–3, John Wiley & Sons, New York 1988 and in Ullmann's Encyclopedia of Industrial Chemistry, 5th edition, vol. A20, pp 213 ff. (Phthalocyanines) and 371 ff. (Pigments, Organic) both incorporated herein by reference. Examples include the following substances: carbon black, titanium dioxide, zinc oxide, azo, anthraquinone, perinone, dioxazine, indanthrone, quinacridone, isoindolinone, perylene, phthalocyanine and thioindigo pigments.

Using the dispersant and the pigments, it is possible to prepare pigment preparations within a wide range of concentrations. In this context it can be advantageous to add a polyolefin as well. In general, pigment preparations of this kind contain from 10 to 70% by weight of pigment, from 2 to 60% by weight of dispersant and from 0 to 70% by weight of an additional polyolefin. The additional polyolefin comprises any of the polymers as specified before being suitable as the crystalline polyolefin (component III) or the substantially amorphous poly-α-olefin (component I). In a preferred embodiment, from 10 to 50% by weight of pigment, from 5 to 40% by weight of dispersant and from 10 to 50% by weight of an additional polyolefin are employed.

In this context, the pigment preparation can be prepared in the solid state by mixing as a dry blend, by mixing melts in an extruder or kneading apparatus, etc. Pigment preparations prepared in this way may be used as master batches for the coloring of polyolefin molding compositions.

In the pigment preparations according to the invention, the pigment, even at high pigment concentrations, is very finely dispersed. In co-rotating twin-screw extruders, degrees of dispersion are achieved which exclude particle sizes of more than 10 μm. Moreover, when the pigment preparations are prepared using the dispersant according to the invention, relatively high production rates are achieved.

The polyolefin to be pigmented comprises any of the polymers as specified before being suitable for the crystalline polyolefin (component III) or the substantially amorphous poly-α-olefin (component I).

The pigment preparations according to the invention are particularly suitable for the production of colored polyolefin fibers. The fine dispersion of pigment, however, is also advantageous in the coloring of injection molding compositions or extrudates, since it brings about a higher color yield in the finished product.

The invention will now be illustrated by way of non-limiting example below. Experiments labelled with letters are not in accordance with the invention. % by weight refers to total weight of dispersant.

PREPARATION OF THE DISPERSANTS

Comparison Example A

A polyolefin wax (PP wax) having a density of about 0.88 g/cm$^3$, a softening point of about 160° C. and a viscosity at 170° C. of 1500 mpa·s was used without further additives.

Comparison Example B

A melt mixture was prepared from the following components:

79% by weight of a substantially amorphous poly-α-olefin comprising 66% by weight propene and 34% by weight 1-butene and having a viscosity of 3000 mpa·s at 190° C. and 21% of an isotactic polypropylene (MFR 230/2.16 of 37.5 g/10 min).

Comparison Example C

Melt mixture of 50% by weight of a substantially amorphous poly-α-olefin (as in Comparison Example B) and 50% by weight of a polyolefin wax (PE wax) having a density of 0.92 g/cm$^3$ at 25° C. and a dropping point of about 110° C.

Comparison Example D

A polyacrylic acid ester having the following composition was used without further additives:

Acrylate copolymer ($M_n$=5600, $M_w/M_n$=1.9) which was prepared, starting from a polymethyl acrylate ($M_n$=3000) by transesterification of 30% of all of the monomeric units with stearyl alcohol in accordance with DE-C 42 36 337.

Example 1

A melt mixture of the following components was prepared:

75% by weight of a substantially amorphous poly-α-olefin (as in Comparison Example B), 20% by weight of an isotactic polypropylene (MFR 230/2.16 of 37.5 g/10 min), and 5% by weight of the polyacrylic acid ester according to Comparison Example D.

Example 2

A melt mixture of the following components was prepared:

47.5% by weight of a substantially amorphous poly-α-olefin (as in Comparison Example B), 47.5% by weight of a polyolefin wax (as in Comparison Example C) and 5% by weight of the polyacrylic acid ester according to Comparison Example D.

Example 3

A melt mixture of the following components was prepared:

45% by weight of a substantially amorphous poly-α-olefin (as in Comparison Example B), 45% by weight of a polyolefin wax (as in Comparison Example C) and 10% by weight of the polyacrylic acid ester according to Comparison Example D.

Example 4

A melt mixture was prepared from the following components:

90% by weight of a polyolefin wax (as in Comparison Example A), and

10% by weight of the polyacrylic acid ester according to Comparison Example D.

Production of the Pigment Preparations

Pigment, dispersant and polyolefin are mixed at 900 rpm in a Henschel mixer for 10 minutes and the mixture is then processed in a twin-screw extruder to granules. The results are set out later on.

Determination of the Dispersing Effect Using the Pressure Filter Test

One of the most important test methods for assessing the dispersion quality of pigments in coloring master batches is the pressure filter test.

In this method, a premix comprising master batch and (polyolefin) natural material, with an overall pigment content of 10% by weight, is melted in an extruder and extruded using a toothed-gear pump through a defined filter assembly. The measurement ends either when a pressure of 250 bar is reached or when 60 minutes are up.

The measure of the master batch quality is the so-called pressure filter value (DP) which is calculated by the following formula:

$$DF = \frac{(P_{max} - P_o) \times F \times 100}{t \times K \times G} \text{ (bar} \times \text{cm}^2/\text{g)}$$

in which:

$P_{max}$=final pressure (bar)

$P_o$=pressure when operating only with natural material (bar)

F=filter area (cm$^2$)

t=measurement time (min)

K=concentration (%)

G=throughput (g/min)

The pressure filter value is therefore a measure of how quickly the filter assembly becomes blocked by pigment agglomerates. Low DF values indicate good dispersion of the pigments.

Examples 5 to 7 and Comparison Examples E to I

As described above, a pigment preparation was produced from the following components:

18% by weight of phthalocyanine blue (Heliogenblau K 7090, BASF, Cu phthalocyanine-β),
2% by weight of phthalocyanine green,
3% by weight of TiO$_2$,
2% by weight of carbon black,
dispersant of the type and in the quantity indicated in Table 1,
remainder: polypropylene (KFR 230/2.16 of 20 g/10 min)

TABLE 1

Pressure filter test

| Example or Comparison Example | Dispersant from Example or Comparison Example No. | Amount of dispersant [% by wt.] | Pressure filter value |
|---|---|---|---|
| 5 | 1 | 10 | 3.7 |
| 6 | 2 | 10 | 1.7 |
| 7 | 4 | 10 | 5.3 |
| E | A | 10 | 6.7 |
| F | B | 10 | 6.1 |
| G | C | 10 | 7.5 |
| H | D | 2 | 9.3 |
| I | D | 4 | 6.7 |

Comparison Examples H and I (in accordance with DE-C 42 36 337) show that, even with far more than proportional added quantities of noncompounded polyacrylic acid ester, unsatisfactory results are still obtained.

Example 8 and Comparison Example J

As described above, a pigment preparation is produced from the following components:

50% by weight of polypropylene (MFR 230/2.16 of 20 g/10 min)
30% by weight of Irgalite Red 2 BP pigment [Azo Red 2B Toner(Ca) Pigment Red 48:2]
20% by weight of dispersant of the type indicated in Table 2.

TABLE 2

Pressure filter test

| Example or Comparison Example | Dispersant from Example or Comparison Example No. | Pressure filter value |
|---|---|---|
| 8 | 3 | 5.7 |
| J | A | 14 |

Example 9 and Comparison Example K

As described above, a pigment preparation was produced from the following components:

50% by weight of polypropylene (MFR 230/2.16 of 20 g/10 min)
30% by weight of Irgalite Rubine L4BD Pigment [Azo Red 4B Toner(Ca) Pigment Red 57:1]
20 parts by weight of dispersant of the type indicated in Table 3.

TABLE 3

Pressure filter test

| Example or Comparison Example | Dispersant from Example or Comparison Example No. | Pressure filter value |
|---|---|---|
| 9 | 3 | 2.7 |
| K | A | 6.4 |

Example 10 and Comparison Example L

See Table 4.

TABLE 4

Compositions and pressure filter test

| | Example 10 [% by wt.] | Comparison Example L [% by wt.] |
|---|---|---|
| Polypropylene (MFR 230/2.16 of 20 g/10 min) | 40 | 30 |
| Phthalocyanine blue | 40 | 40 |
| Dispersant from Example 3 | 20 | — |
| Dispersant from Comparison Example A | — | 30 |
| Pressure filter value | 0.4 | 2.1 |

This application is based on German patent application 195 16 387.7 filed May 4, 1995, incorporated herein by reference.

What is claimed as new and desired to be secured by Letters Patent of the United States is:

1. A dispersant, comprising:
   I from 1% to 50% by weight of a polyacrylic acid ester, which is prepared by transesterification of a polyalkyl acrylate having ester groups and being obtained by free-radical polymerization, and whose alkyl radical contains from 1 to 3 carbon atoms; and
   II) from 50% to 99% of at least one additional component selected from the group consisting of a poly-α-olefin having a viscosity of from 1,000 to 100,000 mpa·s at 190° C., which is a polymer or copolymer of one or more α-olefins having from 2 to 6 carbon atoms, a polyolefin wax, and a crystalline polyolefin.

2. The dispersant of claim 1, wherein said polyacrylic acid ester is prepared by transesterification of said polyalkyl acrylate with:
   a) one or more saturated aliphatic alcohols having 4 to 30 carbon atoms; or
   b) one or more unsaturated aliphatic alcohols having 8 to 30 carbon atoms.

3. The dispersant of claim 2, wherein said polyacrylic acid ester is prepared by transesterification of said polyalkyl acrylate with:
   c) one or more polyoxyalkylenemonools of the formula:

   $R^1O-(C_nH_{2n}O-)_xH$ where $R^1$ is a hydrocarbon radical of a starting alcohol $R^1OH$ or an alkylsulphonate radical, with a maximum of 30 carbon atoms;
   n is 2, 3 or 4; and
   x is from 1 to 70; or
   d) one or more dialkylaminoalkanols of the formula $HO-R^2-NR^3R^4$, in which $R^2$ is a divalent alkylene radical having 2 to 4 carbon atoms, and $R^3$ and $R^4$ are identical or different and are alkyl radicals having 1 to 4 carbon atoms; wherein the molar ratio of the alcohol components a)+b)+c) to the dialkylaminoalcohols d) is from 1:0 to 1:0.5, and wherein components a) to d) are used in amounts such that from 25 to 70% of the ester groups of the polyalkyl acrylate are transesterified.

4. The dispersant of claim 1, wherein the poly-α-olefin having said viscosity of from 1,000 to 100,000 mpa·s at 190° C. has the following composition:
   I) from 3 to 75% by weight of one or more α-olefins having from 4 to 6 carbon atoms;
   II) from 25 to 95% by weight of propene; and
   III) from 0 to 20% by weight of ethylene.

5. The dispersant of claim 4, wherein the poly-α-olefin is selected from the group consisting of propene/1-butene/ethylene terpolymer, propene/1-butene copolymer, propene/ethylene copolymer, 1-butene/ethene copolymer and atactic polypropylene.

6. The dispersant of claim 1, wherein the polyolefin wax is present in an amount of from 5 to 90% by weight.

7. The dispersant of claim 1, wherein the polyolefin wax has a weight-average molecular weight $\overline{M}_w$ in the range of from 700 to 30,000.

8. The dispersant of claim 1, wherein the polyacrylic acid ester has a weight-average molecular weight $\overline{M}_w$ of from 1,000 to 20,000.

9. The dispersant of claim 1, wherein the content of the polyacrylic acid ester in the dispersant is from 3 to 30% by weight.

10. The dispersant of claim 1, wherein said poly-α-olefin having said viscosity of from 1,000 to 100,000 mpa·s at 190° C. is present in an amount of from 5 to 90% by weight.

11. The dispersant of claim 10, wherein said poly-α-olefin is present in an amount of more than 20% by weight.

12. The dispersant of claim 7, wherein the polyolefin wax has a weight-average molecular weight $\overline{M}_w$ in the range of 900 to 9,000.

13. The dispersant of claim 9, wherein the content of teh polyacrylic acid ester in the dispersant is from 5 to 15% by weight.

14. The dispersant of claim 1, wherein n has a mean value of from 2 to 3, and X has a mean value of from 4 to 50.

15. A composition, comprising the following components based on total weight of the composition:
   I) from 10 to 70% by weight of a pigment;
   II) from 2 to 60% by weight of the dispersant of claim 1; and
   III) from 0 to 70% by weight of an additional polyolefin.

16. The composition of claim 15, comprising:
   I) from 10 to 50% by weight of said pigment;
   II) from 5 to 40% by weight of said dispersant; and
   III) from 10 to 50% by weight of said additional polyolefin.

17. The composition of claim 15, further comprising a polyolefin to be pigmented.

18. The composition of claim 15, wherein said pigment is selected from the group consisting of carbon black, titanium dioxide, zinc oxide, azo dye, anthraquinone dye, perinone dye, dioxazine dye, indanthrone dye, quinacridone dye, isoindolinone dye, perylene dye, phthalocyanine dye and thioindigo dye.

* * * * *